J. Totten.
Gang Plow.

No. 86,472.  Patented Feb. 2, 1869.

Witnesses
A. Bennerkendorf
Wm. A. Morgan

Inventor
J Totten
Munn & Co
Attorneys

United States Patent Office.

JOSEPH TOTTEN, OF ADAMS, ILLINOIS.

Letters Patent No. 86,472, dated February 2, 1869.

IMPROVEMENT IN GANG-PLOWS.

The Schedule referred to in these Letters Patent and making part of the same.

*To all whom it may concern:*

Be it known that I, JOSEPH TOTTEN, of Adams, in the county of Adams, and State of Illinois, have invented a new and useful Improvement in Gang-Plows; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved gang-plow, which shall be so constructed and arranged as to do its work better, more accurately, and with less strain upon the horses than when constructed in the ordinary manner, and which shall at the same time be easily adjusted to cut furrows of different widths and of different depths, as may be desired; and It consists in the construction and combination of various parts of the machine, as hereinafter more fully described.

A is the large wheel of the machine, which runs in the furrow, and to the axle B of which are attached the bars C and D.

E is a bar, one end of which is attached to the rear end of the short bar C.

The bar E is also attached to the rear end of the long bar D, and has its other or face end bent upward at right angles.

F is a bar, one end of which is attached to the forward end of the short bar C.

The bar F is also attached to the forward end of the long bar D, and has its other end bent downward at right angles.

G is a bar, the forward end of which inclines downward, and the ends of which enter the castings H, which are adjustably secured, the one to the upwardly-projecting end of the bar E, and the other to the downwardly-projecting end of the bar F, by means of keys, or other conveniently-detachable device, so that the bar G may be raised or lowered, according to the greater or less depth at which it is desired to have the plows run in the ground.

To the castings, H, are swivelled the upper ends of the curved or bent arms I, to the lower ends of which are securely attached the journals of the caster-wheels J and K.

L is the draught-bar, the rear end of which is attached to the axle B, midway between the bars C and D.

The draught-bar L is also attached to the bar F, and through its forward end are formed holes, for the adjustable attachment of the draught-clevis.

The draught-bar L is strengthened and braced against the draught-strain by the brace-bar M, the forward end of which is attached to the forward end of the draught-bar L, and the other or rear end of which is secured to the forward part of the bar D.

Figure 1:
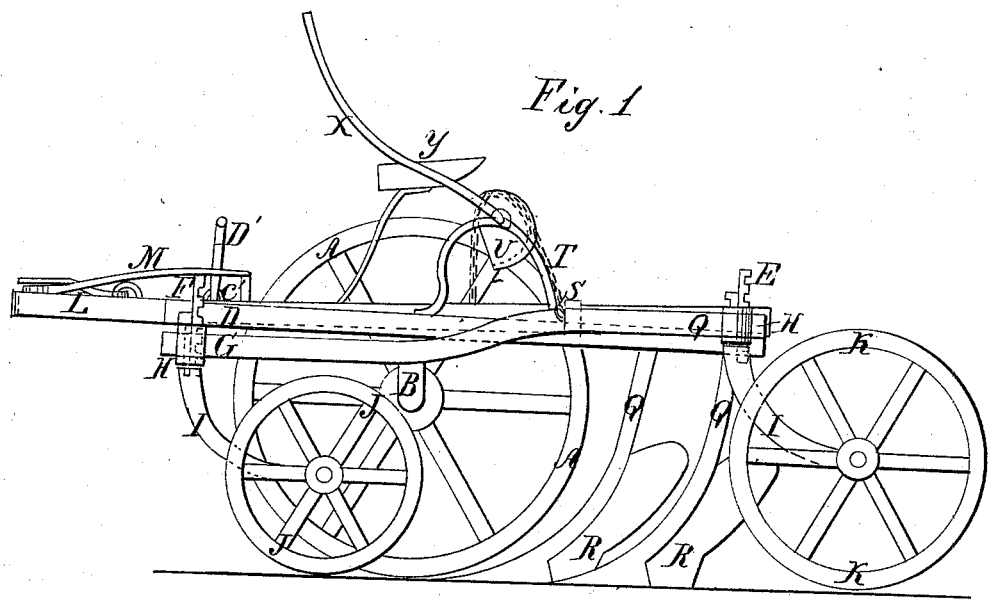
Figure 1 is a side view of the landside of my improved machine.
Figure 2:
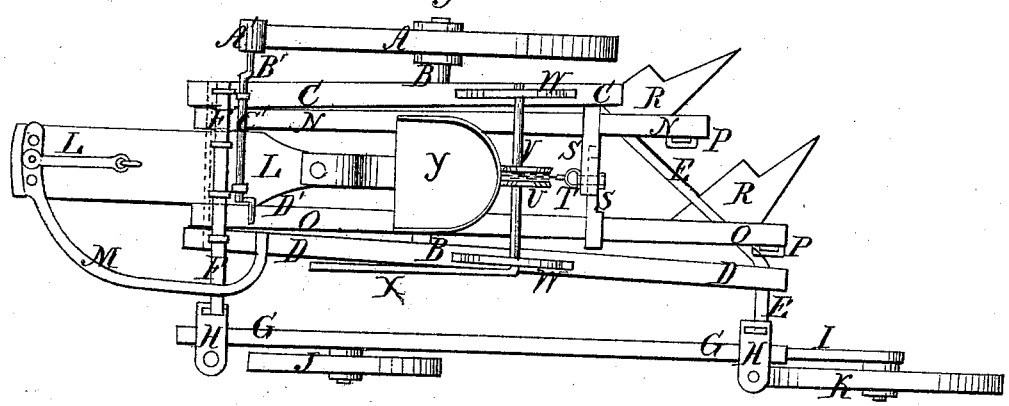
Figure 2 is a top or plan view of the same.

N and O are the plow-beams, the forward ends of which are pivoted to and between the forward ends of the draught-bar L and the bars C and D, by a bolt passing through the said beams and bars, as shown in dotted lines in fig. 2.

The beams N and O pass back over the axle B and bar E, and to their rear ends are secured by clamps P, or other convenient and suitable device, the standards Q, to the lower ends of which the plows R are attached.

The rear parts of the plow-beams N and O are adjustably connected by the bars or arms S, so that the said beams may be adjusted and secured further apart or closer together, according to the required width of the furrows.

To the connecting-device S is secured one end of the chain T, which passes over and is secured to the cam or eccentric U.

The cam or eccentric U is attached to the shaft V, which works in bearings in the supports W, attached to the bars C and D, and to one end of which is attached the lever X, which extends forward into such a position that it may be conveniently reached and operated by the driver from his seat Y, to raise the plows from the ground.

A' is the brake-shoe, which is attached to the end of the crank B', formed upon the end of the shaft C', which works in bearings attached to the forward ends of the bar C and draught-bar L, and to the other end of which is attached the foot-lever D', which extends up into such a position that it may be conveniently operated by the driver with his foot.

By this construction and arrangement of the various parts of the machine, it is enabled to turn a square corner, and it also causes a greater part of the weight of the machine, and of the furrows being raised and turned over, to be borne by the large wheel A, which runs in the bottom of a furrow, and consequently upon a level and smooth bed, thereby greatly diminishing the draught, and enabling two or three horses to do the work that would otherwise require three or four.

I claim as new, and desire to secure by Letters Patent—

The combination of the wheel A, axle B, bars C and D, end bars E and F, constructed as described, bar G, castings H, pivoted caster-arms I, wheels J K, and draught-bar L, with each other, substantially as herein shown and described, and for the purposes set forth.

JOSEPH TOTTEN.

Witnesses:
THOMAS J. ENLOW,
SOLON TOTTEN.